United States Patent [19]
Collier et al.

[11] 3,708,759
[45] Jan. 2, 1973

[54] LIQUID LASER

[75] Inventors: Franck Collier, Longjumeau; Jean-Daniel Dauchy, Paris; Christian Le Sergent, Sainte-Genevieve-des-Bois; Maurice Michon, Draveil, all of France

[73] Assignee: Compagnie Generale d'Electricite, Paris, France

[22] Filed: Aug. 31, 1971

[21] Appl. No.: 176,457

[30] Foreign Application Priority Data

Sept. 4, 1970    France..................................7032264

[52] U.S. Cl...............................331/94.5, 252/301.4
[51] Int. Cl................................................H01s 3/20
[58] Field of Search ..................331/94.5; 252/301.4

[56]    References Cited

UNITED STATES PATENTS 3,631,361    12/1971    Blumenthal.........................331/94.5

OTHER PUBLICATIONS

Weichsel Gartner et al., Z Naturforschaung, Vol. 25a, Aug.–Sept. 1970, pp. 1244–1247

Primary Examiner—Ronald L. Wibert
Assistant Examiner—Robt. J. Webster
Attorney—Richard C. Sughrue et al.

[57]    ABSTRACT

A laser using a liquid laser medium which comprises a doping medium in solution in a solvent wherein the solvent includes thionyl chloride ($SOCl_2$). The thionyl chloride permits an operating temperature range far greater than that found in the prior art.

5 Claims, 1 Drawing Figure

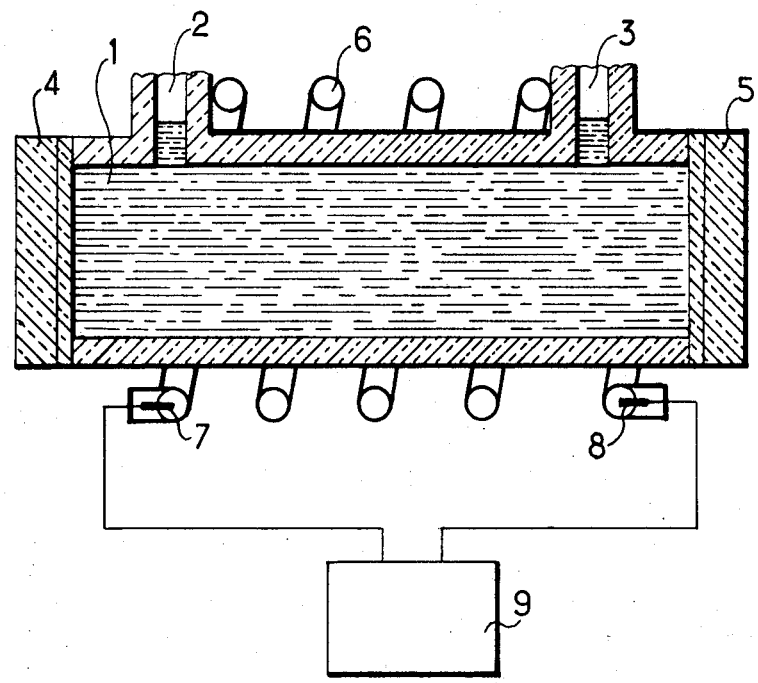

LIQUID LASER

BACKGROUND OF THE INVENTION

1. Field of the Invention

The present invention concerns laser generators and more particularly lasers in which the stimulated emission is obtained in a liquid active material.

2. Description of the Prior Art

A laser generator comprises an active medium disposed in a Fabry-Perot resonating cavity consisting of two partially reflecting mirrors, and a pumping means associated with the active medium.

Three kinds of active media are at present known, namely a solid active medium which can be, for example, a ruby crystal or a rod of neodymium-doped glass; a gaseous active medium such as, for example, a mixture of gases including helium and neon; and a liquid medium.

The presently used liquid active medium in laser generators generally consists of a doping material such as neodymium or other rare earth, in solution in a solvent.

The solvents which are at present known and used are of various natures. For example, there is employed a mixture of selenium oxychloride ($SeOCl_2$) with tin chloride ($SnCl_4$). Another known solvent consists of a mixture of phosphorous oxychloride ($POCl_3$) and a metallic chloride ($MCl_n$), in which M may be chosen from the following list of metals: tin, zirconium, boron, titanium, etc. This solvent may sometimes include water ($H_2O$).

Of course, in these various kinds of solvents, the active doping agent is dissolved in predetermined proportions. For example, neodymium is dissolved in the form of an oxide ($Nd_2O_3$) in proportion of 10% by weight, this percentage not being critical and being variable within fairly wide limits.

Laser generators, in which liquid active media such as those described above are employed, can operate only in a fairly small temperature range. Outside the permitted temperature range, for example between 10° and 80° C, precipitation occurs which immediately inhibits all stimulated emission.

SUMMARY OF THE INVENTION

The present invention has for its object the elimination of these disadvantages.

The present invention has also for its object the provision of a laser generator employing a liquid active medium which is capable of operating in a wider temperature range than existing laser generators.

The present invention relates to a generator operating with a liquid active medium, which comprises a doping medium in solution in a solvent consisting of a mixture including at least phosphorous oxychloride ($POCl_3$) and a metallic chloride of the general formula $MCl_n$, M being a metallic element and n being an integer equal to the valence of M, characterized by the fact that the mixture constituting the solvent includes in addition thionyl chloride ($SOCl_2$).

Further features and advantages of the present invention will become apparent in the course of the following description, which is given with reference to the accompanying illustrative, but non-limiting drawing.

BRIEF DESCRIPTION OF THE DRAWINGS

The single FIGURE is a diagram illustrating the configuration of a laser generator operating with a liquid active medium.

The single FIGURE shows in longitudinal section a form of construction of a laser generator operating with a liquid active medium. It comprises An enclosure 1, preferably of cylindrical form, which has a fluid outlet 2 and a fluid outlet 3 disposed at either end of the cylinder.

The cylindrical enclosure 1 has its end faces cut perpendicularly to its axis. Two mirrors 4 and 5 are positioned on the faces. One of the mirrors has multi-dielectric coatings to permit the laser emission to emerge from the Fabry-Perot resonating cavity formed by the two mirrors 4 and 5.

The laser generator also comprises a pumping means for exciting the liquid active medium. The pumping means may be, as diagrammatically illustrated in the FIGURE, a discharge tube 6 helically coiled around the cylindrical enclosure 1. Electrodes 7 and 8 are connected to a source 9 for supplying to the discharge tube 6 with sufficient energy to enable it to produce a luminous flash to effect an optical pumping of the liquid active laser medium contained in the cylindrical enclosure 1. This energy is generally supplied by the discharge of capacitors.

A liquid laser generator can operate statically or dynamically, that is to say with a fluid which is fixed in the enclosure or with a fluid which is constantly renewed.

By way of example, one of the laser generators serving for the experimental operation with the liquid active medium operates statically. Its active medium consists of a mixture of phosphorous oxychloride ($POCl_3$), a metallic chloride ($MCl_n$) and thionyl chloride ($SOCl_2$). This mixture of three substances constitutes the solvent in which there is dissolved the doping active medium such as, for example, neodymium oxide ($Nd_2O_3$).

By way of example, a solvent in which neodymium oxide is dissolved has the following composition:

$SOCl_2$: 75%; $POCl_3$: 21%; $SnCl_4$: 4%, these percentages being by volume. Neodymium oxide is dissolved in this mixture in such a manner that its neodymium ($Nd$+++) concentration is about 0.1 mole per liter.

Another experiment was carried out, in which water in a concentration of 0.13 mole per liter was added to the above-defined mixture.

Laser generators having such liquid active medium give the same results as known laser generators operating with conventional liquid active medium, it being found that:

The absorption of this new liquid active medium at a wavelength of 1.06 micron is very low;

The addition of thionyl chloride does not in any way contribute to an increase in this absorption;

The radiation lifetime is still just as good, i.e. capable of exceeding 200 microseconds.

The primary advantages of the invention is that in addition to the above, that the liquid active laser medium according to the invention permits operation of laser generators in a temperature range between about −80° C and +70°C, whereas an active medium containing no thionyl only permits operation of the laser generator between about 10° and 90° C.

We claim:

1. A comprising liquid laser active medium comprising a solution of a doping medium in a solvent comprising phosphorous oxychloride; a metallic chloride of the general formula $MCl_n$, wherein M is a metallic element and n is an integer equal to the valence of M; and thionyl chloride.

2. A liquid laser active medium according to claim 1 wherein the metallic element M is tin.

3. A liquid laser active medium according to claim 1 wherein the solvent includes a mixture of thionyl chloride, phosphorous oxychloride and stannic chloride in proportions by volume of 75 percent, 21 percent and 4 percent respectively.

4. A liquid laser active medium according to claim 3 wherein said mixture further includes water.

5. A liquid laser active medium according to claim 4, wherein the solvent includes water in a proportion by volume of 0.13 mole per liter.

* * * * *